: US 11,494,537 B1

(12) United States Patent
Feldman et al.

(10) Patent No.: US 11,494,537 B1
(45) Date of Patent: Nov. 8, 2022

(54) METHOD AND SYSTEM FOR EFFICIENT TESTING OF DIGITAL INTEGRATED CIRCUITS

(71) Applicant: Palo Alto Research Center Incorporated, Palo Alto, CA (US)

(72) Inventors: Aleksandar B. Feldman, Santa Cruz, CA (US); Johan de Kleer, Los Altos, CA (US); Alexandre Campos Perez, San Mateo, CA (US); Ion Matei, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 14 days.

(21) Appl. No.: 17/319,835

(22) Filed: May 13, 2021

(51) Int. Cl.
| | |
|---|---|
| *G06F 30/33* | (2020.01) |
| *G06F 30/30* | (2020.01) |
| *G06F 30/398* | (2020.01) |
| *G06F 30/3308* | (2020.01) |
| *G06F 30/367* | (2020.01) |
| *G01R 31/00* | (2006.01) |

(Continued)

(52) U.S. Cl.
CPC ....... *G06F 30/33* (2020.01); *G01R 31/31813* (2013.01); *G01R 31/31835* (2013.01); *G01R 31/318307* (2013.01); *G01R 31/318357* (2013.01); *G01R 31/318371* (2013.01); *G06F 30/30* (2020.01); *G06F 30/3323* (2020.01); *G06F 30/398* (2020.01); *G01R 31/28* (2013.01); *G06F 11/00* (2013.01); *G06F 30/3308* (2020.01); *G06F 30/367* (2020.01)

(58) Field of Classification Search
CPC ...... G06F 30/33; G06F 30/3323; G06F 30/30; G06F 30/398; G06F 11/00; G01R 31/28; G01R 31/318307; G01R 31/318357; G01R 31/31813; G01R 31/31835; G01R 31/318371

USPC ......... 716/112, 107, 136; 703/15, 2; 714/33, 714/741, 732
See application file for complete search history.

(56) References Cited

U.S. PATENT DOCUMENTS 5,796,990 A * 8/1998 Erle ............... G01R 31/318342
703/15
6,151,694 A * 11/2000 Nozuyama ....... G01R 31/31835
714/724

(Continued)

FOREIGN PATENT DOCUMENTS

CN 110632511 A * 12/2019 ........... G01R 31/343

*Primary Examiner* — Phallaka Kik
(74) *Attorney, Agent, or Firm* — Shun Yao; Yao Legal Services, Inc.

(57) ABSTRACT

One embodiment provides a method and a system for generating test vectors for testing a computational system. During operation, the system obtains a design of the computational system, the design comprising an original system. The system generates a design of a fault-augmented system block by adding a plurality of fault-emulating subsystems to the original system; generates a design of an equivalence-checking system based on the original system and the fault-augmented system block; encodes the design of the equivalence-checking system into a logic formula, with variables within the logic formula comprising inputs and outputs of the original system and inputs and outputs of the fault-augmented system block; and solves the logic formula to obtain a test vector used for testing at least one fault in the computational system.

20 Claims, 15 Drawing Sheets

(51) Int. Cl.
  *G01R 31/28*   (2006.01)
  *G01R 31/3183*   (2006.01)
  *G01R 31/3181*   (2006.01)
  *G06F 30/3323*   (2020.01)
  *G06F 11/00*   (2006.01)

(56) References Cited

U.S. PATENT DOCUMENTS

| | | | | |
|---|---|---|---|---|
| 8,332,201 | B1* | 12/2012 | Briggs | G06F 11/26 |
| | | | | 703/15 |
| 10,592,625 | B1* | 3/2020 | Tang | G01R 31/2894 |
| 10,657,207 | B1* | 5/2020 | Tang | G06F 30/333 |
| 11,132,273 | B1* | 9/2021 | Hicks | G06F 11/3692 |
| 11,204,848 | B1* | 12/2021 | Hicks | G06F 11/3664 |
| 2004/0133833 | A1* | 7/2004 | Nozuyama | G01R 31/318342 |
| | | | | 714/E11.167 |
| 2005/0262409 | A1* | 11/2005 | Wang | G01R 31/318342 |
| | | | | 714/738 |
| 2006/0111873 | A1* | 5/2006 | Huang | G06F 11/27 |
| | | | | 714/E11.169 |
| 2007/0083804 | A1* | 4/2007 | Hirano | G01R 31/3016 |
| | | | | 714/795 |
| 2009/0204924 | A1* | 8/2009 | West, Jr. | G06F 11/261 |
| | | | | 703/22 |
| 2011/0179326 | A1* | 7/2011 | Sharma | G06F 11/277 |
| | | | | 714/728 |
| 2012/0079442 | A1* | 3/2012 | Akar | G06F 30/398 |
| | | | | 716/112 |
| 2014/0088947 | A1* | 3/2014 | Anemikos | G01R 31/3004 |
| | | | | 702/120 |
| 2017/0193155 | A1* | 7/2017 | Lin | G01R 31/318371 |
| 2018/0267098 | A1* | 9/2018 | Kundu | G01R 31/3177 |
| 2019/0236240 | A1* | 8/2019 | Huang | G06N 20/00 |
| 2020/0175124 | A1* | 6/2020 | Ananthapur Bache | |
| | | | | G06F 30/18 |
| 2020/0311248 | A1* | 10/2020 | Dwarakanath | G06F 21/445 |
| 2022/0065929 | A1* | 3/2022 | Lin | G01R 31/3177 |
| 2022/0188219 | A1* | 6/2022 | Hicks | G06F 11/3692 |

* cited by examiner

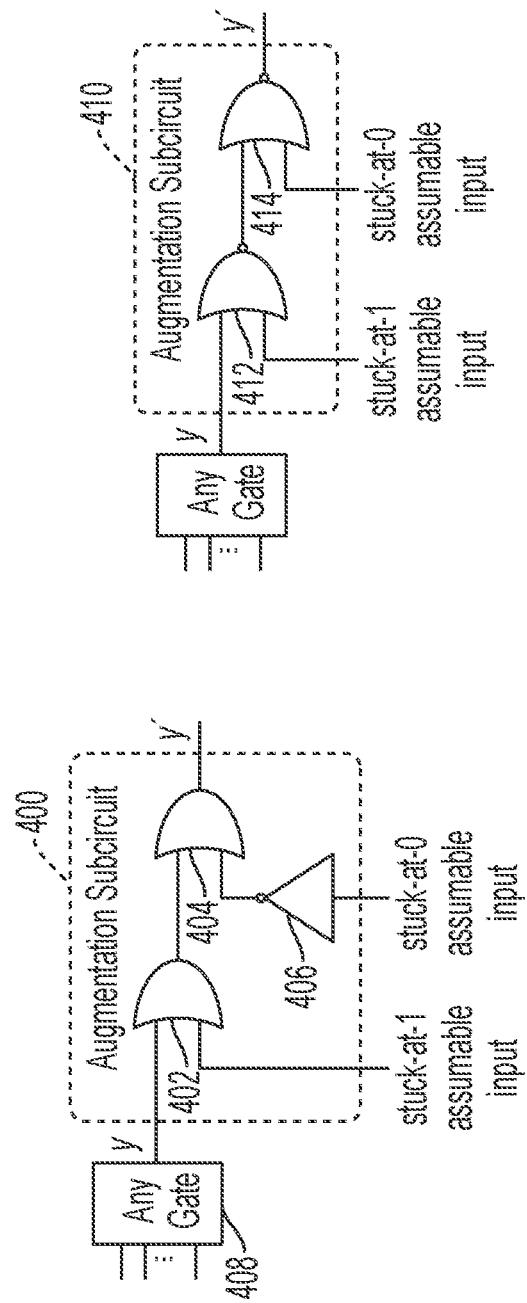

METHOD AND SYSTEM FOR EFFICIENT TESTING OF DIGITAL INTEGRATED CIRCUITS

BACKGROUND

Field

This disclosure is generally related to testing of physical systems, such as digital Integrated Circuits (ICs). More specifically, this disclosure is related to a system and method for generating testing vectors that facilitate efficient testing of the physical systems.

Related Art

Digital Integrated Circuits (ICs) are ubiquitously present in people's life, from washing machines to spaceships. Advances in the lithography technologies have enabled the feature size of the circuits to decrease continuously, thus facilitating the development of high-density ICs. However, as the feature size decreases, defects (e.g., due to impurities in the substrate, misalignments of masks, trembling during exposure, etc.) in ICs become more common and can lead to the malfunction of the circuits. Testing of the ICs is an important step to ensure the quality of the final product comprising the ICs. The increasing complexity of the ICs also increases the cost for testing. It is estimated that testing cost can be up to 40% of the total production cost of modern digital ICs.

SUMMARY

One embodiment provides a method and a system for generating test vectors for testing a computational system. During operation, the system obtains a design of the computational system, the design comprising an original system. The system generates a design of a fault-augmented system block by adding a plurality of fault-emulating subsystems to the original system; generates a design of an equivalence-checking system based on the original system and the fault-augmented system block; encodes the design of the equivalence-checking system into a logic formula, with variables within the logic formula comprising inputs and outputs of the original system and inputs and outputs of the fault-augmented system block; and solves the logic formula to obtain a test vector used for testing at least one fault in the computational system.

In a variation on this embodiment, the design of the equivalence-checking system comprises the original system and one or more fault-augmented system blocks, and generating the design of the equivalence-checking system comprises: coupling the inputs of the original system to corresponding inputs of each fault-augmented system block and coupling the outputs of the original system and corresponding outputs of each fault-augmented system block to a comparison module.

In a further variation, the fault-augmented system block comprises a set of fault-assumable inputs. A respective fault-assumable input corresponds to a fault-emulating subsystem. Generating the design of the equivalence-checking system further comprises coupling the set of fault-assumable inputs to a first constraint system.

In a further variation, the first constraint system is configured to apply a constraint on the set of fault-assumable inputs to ensure that the fault-augmented system block simulates one fault.

In a further variation, generating the design of the equivalence-checking system further comprises coupling the fault-assumable inputs in the one or more fault-augmented system block to a second constraint system. The second constraint system is configured to apply a constraint to ensure that different fault-augmented system blocks have different sets of fault-assumable inputs.

In a further variation, generating the design of the equivalence-checking system comprises adding one fault-augmented system block at a time until there is no satisfying solution to the logic formula.

In a further variation, the system generates a design of an extended system, which includes the equivalence-checking system and at least one copy of the equivalence-checking system, and solves a logic formula corresponding to the design of the extended system. Generating the design of the extended system comprises coupling corresponding fault-assumable inputs from different fault-augmented system blocks of each of the equivalence-checking systems to a third constraint system configured to apply a constraint to ensure that an arbitrary fault is simulated by at least one fault-augmented system block.

In a further variation, generating the design of the extended system comprises adding one copy of the equivalence-checking system at a time until a satisfying solution to the logic formula corresponding to the design of the extended system is found.

In a further variation, the satisfying solution to the logic formula corresponding to the design of the extended system comprises a plurality of sets of assignments to the inputs of the original systems included in the extended system. A respective set of assignments form a test vector, and test vectors corresponding to the plurality of sets of assignments form a test suite capable of testing any arbitrary fault in the computational system.

In a variation on this embodiment, the computational system comprises one or more of: a digital circuit; an analog circuit; a quantum circuit; a reversible computing circuit; an optical circuit; a quantum optical circuit; a processor; and a computer program.

BRIEF DESCRIPTION OF THE FIGURES

FIG. 4A illustrates an exemplary implementation of augmenting a circuit for testing stuck-at faults, according to one embodiment.

FIG. 4B illustrates an exemplary implementation of augmenting a circuit for testing stuck-at faults, according to one embodiment.

In the figures, like reference numerals refer to the same figure elements.

DETAILED DESCRIPTION

Figure 1:
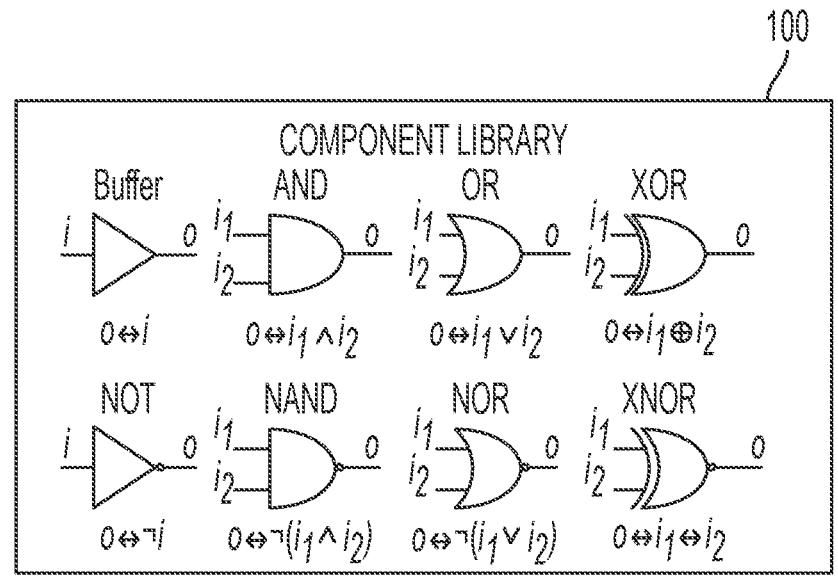
FIG. 1 illustrates an exemplary component library, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of generating an optimal set of testing vectors for testing a digital circuit. During operation, the system receives the design of a to-be-tested circuit (i.e., the original, no fault circuit design) and designs a fault-augmented circuit block based on the original circuit design. The designed fault-augmented circuit block can include, in addition to the components in the original circuit design, subcircuits that can simulate potential faults in the circuit. The test system can further design a miter circuit using the original circuit design and the designed fault-augmented circuit block and convert the miter circuit design to a Boolean formula. This way, the problem of generating a testing vector becomes the problem of finding a satisfying solution (e.g., by using a SAT solver) to the Boolean formula. In some embodiment, an extended miter circuit can be designed in such a way that a test suite that can test potential single-faults in all components of the entire circuit can be generated by running the SAT solver once. When the extended miter circuit is properly designed, the test suite can include a minimum number of test vectors, thus significantly improving the testing efficiency. In addition to digital electrical circuits, the dis-closed solution can also be used to generate test vectors for other types of physical systems, including but not limited to: mechanical systems, analog electrical systems, electro-optical systems, electro-mechanical systems, processors, reversible computing circuits, quantum circuits, optical circuits, quantum optical circuits, computer programs, etc. Depending on the physical system being tested, the miter can be constructed using the appropriate model of the non-fault system and the corresponding fault-augmented model.

Fundamentals of Digital Circuit Testing

A digital circuit design can be encoded as a Boolean formula, with the inputs and outputs of the circuit being variables in the Boolean formula. A multi-output Boolean function can be defined as a function $f: \{0,1\}^m \rightarrow \{0,1\}^n$ for some $\{m, n\} \in \square$. Common Boolean functions can include negation (NOT or $\neg$), conjunction (AND or $\wedge$), disjunction (OR or $\vee$), exclusive or (XOR or $\oplus$), implication ($\rightarrow$), and logical equivalence ($\leftrightarrow$).

Figure 2:
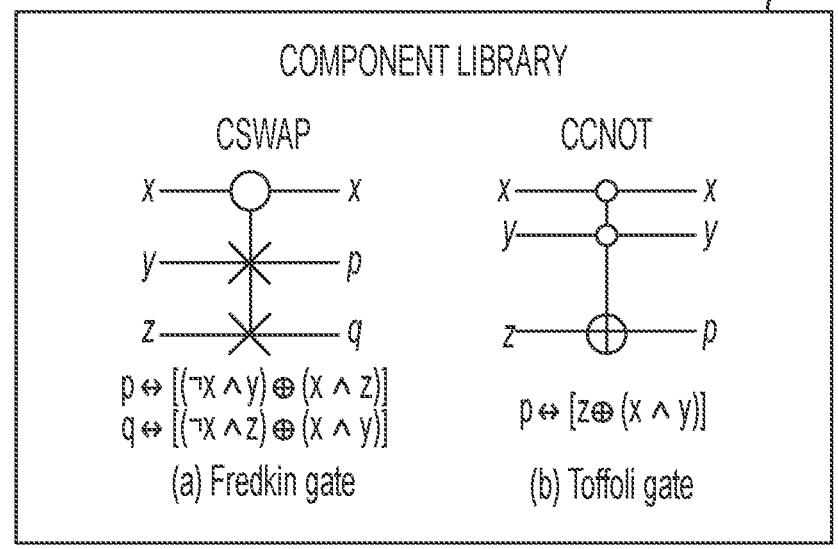
FIG. 2 illustrates an exemplary component library, according to one embodiment.

Although similar in many ways, a Boolean circuit is different from a Boolean function. One of the most important differences is that circuits use bases while functions do not. A basis B can be regarded as the elementary unit of sharing or as an abstract component library. Unlike in the real world, though, each basis function can be used infinitely many times, and all functions in a basis have the same cost. FIG. 1 illustrates an exemplary component library, according to one embodiment. In FIG. 1, component library 100 can include a number of digital circuit gates having one or two inputs, including AND, OR, XOR, NOT, NAND, NOR, and XNOR gates. In addition to the gates (or functions) shown in FIG. 1, a component library can also include gates having multiple outputs. FIG. 2 illustrates an exemplary component library, according to one embodiment. More specifically, component library 200 can include a Fredkin gate and a Toffoli gate, which are also known as CSWAP (controlled-swap) and CCNOT (controlled-controlled-not) gates, respectively. These gates can have applications in reversible and quantum computing. A component library can also include higher-level components used for constructing a computational system, such as adders, multiplexers, barrel shifters, etc. Depending on the physical system being tested, the component library can include different types of components.

Given a basis B, a Boolean circuit C over B can be defined as $C = \langle V, E, \alpha, \beta, \chi, \omega \rangle$, where $\langle V, E \rangle$ is a finite directed acyclic graph, $\alpha: E \rightarrow \square$ is an injective function, $\beta: V \rightarrow B \cup \{*\}$, $\chi: V \rightarrow \{x_1, x_2, \ldots, x_n\} \cup \{*\}$, and $\omega: V \rightarrow \{y_1, y_2, \ldots, y_m\} \cup \{*\}$. Note that in this disclosure, symbol "$\rightarrow$" is used for both implication and function mapping. For the above Boolean circuit C, a number of conditions must hold. If $v \in V$ has an in-degree 0, then $\chi(v) \in \{x_1, x_2, \ldots, x_n\}$ or $\beta(v)$ is a 0-ary Boolean function (i.e., a Boolean constant) in B. If $v \in V$ has an in-degree $k>0$, then $\beta(v)$ is a k-ary Boolean function from B. For every i, $1 \leq i \leq n$, there is exactly one node $v \in V$ such that $\chi(v) = x_i$. For every i, $1 \leq i \leq m$, there is exactly one node $v \in V$ such that $\omega(v) = y_i$. The function $\alpha$ determines the ordering of the edges that go into a Boolean function when the ordering matters (such as in implication). The function $\alpha$ is not necessary if B only includes symmetric functions. The function $\beta$ determines the type (i.e., a function in the basis B) of each node in the circuit. The function $\chi$ specifies the set of input nodes $\{x_1, x_2, \ldots, x_n\}$. The function $\omega$ specifies the set of output nodes $\{y_1, y_2, \ldots, y_m\}$. A node v is non-output, or computations, if $\chi(v) = *$ and $\omega(v) = *$.

Figure 3:
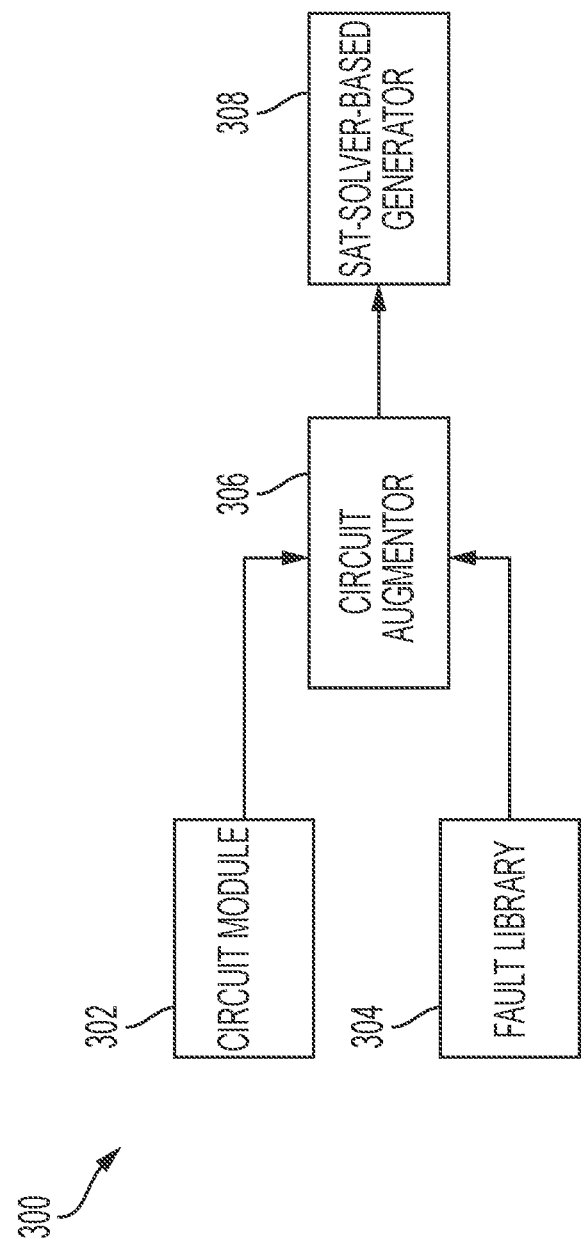
FIG. 3 illustrates the block diagram of an exemplary test-pattern generator, according to one embodiment.

FIG. 3 illustrates the block diagram of an exemplary test-pattern generator, according to one embodiment. Test-pattern generator 300 can include a circuit module 302, a fault library 304, a circuit augmentor 306, and a SAT-solver-based generator 308. Circuit module 302 can include a description of the to-be-tested physical circuit in its error-free form (e.g., a form according to its original design). For example, the description can be in the form of a netlist that includes a list of components in the circuit and a list of nodes to which the components are connected. In one embodiment, the description of the to-be-tested circuit can be imported from an automated circuit design tool (e.g., in the form of a circuit layout). In this disclosure, the term "circuit" can sometimes be interchangeable with the term "circuit description" or "circuit design." It is not always referred to an actual physical circuit and can be referred to the design or description of the physical circuit.

Fault library 304 includes various types of fault that require testing. In addition to the stuck-at faults (e.g., stuck-at-1 and stuck-at-0) commonly tested by conventional testing systems, fault library 304 can include additional types of fault, such as the wrong-component-type fault (e.g., a supposedly OR gate behaves like an AND gate or vice versa), the connection-failure fault (e.g., an open wire), the bridging fault (e.g., a shorted connection to the ground or other wires), etc.

Circuit augmentor 306 constructs a composite circuit design which can include all possible faults in the fault library. For example, potential faults can be simulated by augmenting the original circuit design using standard components in a component library (e.g., component library 100). The fault-augmented circuit design can have the same set of primary inputs and outputs as the original circuit design and can include a new set of assumable inputs, which allow a simulation system to simulate the effect of a fault by assigning values to them. SAT-solver-based generator 308 can include a SAT-solver that finds satisfying solutions to a Boolean formula corresponding to the fault-augmented circuit design. Test patterns for testing the to-be-tested physical circuit can be generated based on those satisfying solutions.

FIG. 4A illustrates an exemplary implementation of augmenting a circuit design for testing stuck-at faults, according to one embodiment. In FIG. 4A, augmentation subcircuit 400 can include an AND gate 402, an OR-gate 404, and an inverter 406. When augmentation subcircuit 400 is coupled to the output of a logical gate (which can be any type of logic gate) 408, it can simulate a stuck-at fault occurring at the logic gate. When the stuck-at-1 assumable input (which is coupled to AND gate 402) is set as 1, the output of augmentation subcircuit 400 will always be 1, regardless of the status of the coupled gate (i.e., logic gate 408). Similarly, when the stuck-at-0 assumable input (which is coupled to inverter 406) is set as 1, the output of augmentation subcircuit 400 will always be 0, regardless of the status of the coupled gate (i.e., logic gate 408). Hence, by setting the stuck-at-1 or stuck-at-0 assumable input, one can simulate, respectively, the stuck-at-1 or stuck-at-0 fault at the coupled gate.

FIG. 4B illustrates an exemplary implementation of augmenting a circuit design for testing stuck-at faults, according to one embodiment. In FIG. 4B, augmentation subcircuit 410 can include NOR gates 412 and 414, with the stuck-at-1 assumable input coupled to NOR gate 412 and the stuck-at-0 assumable input coupled to NOR gate 414. Note that augmentation subcircuit 400 and augmentation subcircuit 410 are logically equivalent to each other, meaning that for every combination of primary inputs the two circuits produce matching primary outputs. Also note that the number of gates in augmentation subcircuit 410 is less than the number of gates in augmentation subcircuit 400. The reduced number of gates can increase the computational efficiency when generating the test patterns, considering that an augmentation subcircuit will need to be inserted at the output of each gate in the circuit and at each primary input in order to simulate all possible fault behaviors in the circuit.

Figure 4C:
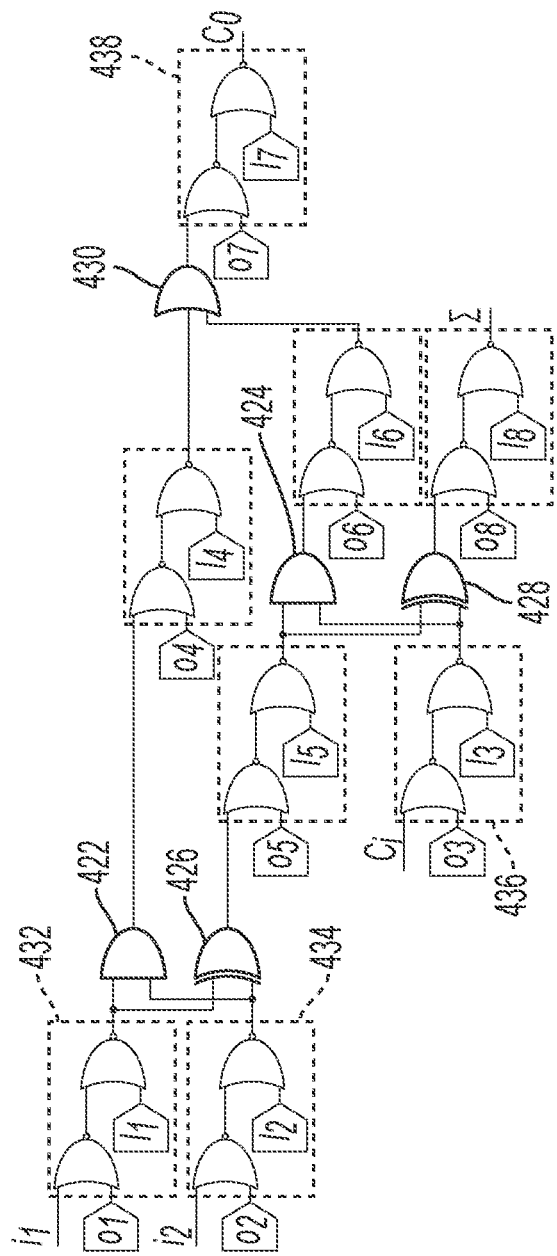
FIG. 4C illustrates an exemplary circuit augmented with struck-at fault-augmentation subcircuits, according to one embodiment.

FIG. 4C illustrates an exemplary circuit design augmented with struck-at fault-augmentation subcircuits, according to one embodiment. In FIG. 4C, a full-adder circuit includes AND gates 422 and 424, XOR gates 426 and 428, and OR gate 430. As discussed before, to simulate a potential stuck-at fault, a stuck-at-fault-augmentation subcircuit is inserted at the output of each gate in the full-adder circuit and at each primary input. For example, subcircuits 432, 434, and 436 are respectively coupled the primary inputs of the adder circuit, and subcircuit 438 is coupled to the output of OR gate 430. The output of each of the other gates (i.e., gates 422-428) is also coupled to a stuck-at-fault-augmentation subcircuit. In FIG. 4C, the stuck-at-fault-augmentation subcircuit is implemented using two NOR gates. In practice, other types of circuit implementation are also possible.

In addition to the stuck-at faults, the fault library includes other types of fault that can be simulated using an augmentation subcircuit. For example, a wrong-component-type fault refers to the situation when a particular type of gate behaves like a different type of gate. For example, an AND gate behaves like an OR gate, or vice versa. In some embodiments, to model such fault behavior, the system can automatically replace each gate in a circuit with a special kind of subcircuit, referred to as a universal component cell.

A universal component cell can be a Boolean circuit that can be configured to perform as any one of the gates in a component library (e.g., component libraries 100 and 200 shown in FIG. 1 and FIG. 2, respectively). In some embodiments, universal component cells can be constructed dynamically depending on the content of the component library and the number of inputs and outputs.

Figure 5:
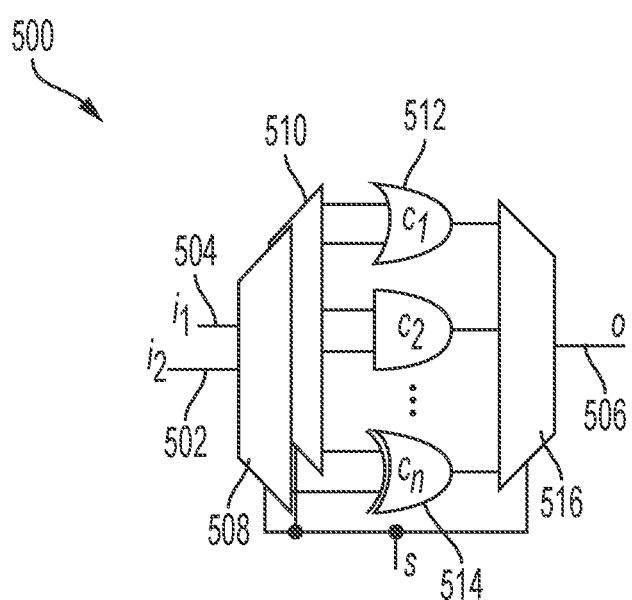
FIG. 5 illustrates an exemplary universal component cell, according to one embodiment.

FIG. 5 illustrates an exemplary universal component cell, according to one embodiment. Universal component cell 500 can include a number of input wires (e.g., input wires 502 and 504) and at least an output wire (e.g., output wire 506). Each input wire can be sent, via a demultiplexer (e.g., demultiplexer 508 or 510) to a set of components (e.g., components 512 and 514). In some embodiments, the set of components can include all components in a component library. For example, the set of components shown in FIG. 5 can include gates (e.g., the OR gate, the AND gate, and the XOR gate) that belong to component library 100 shown in FIG. 1. The outputs of all components can be sent, via a multiplexer 516, to output wire 506.

Figures 6A, 6B:
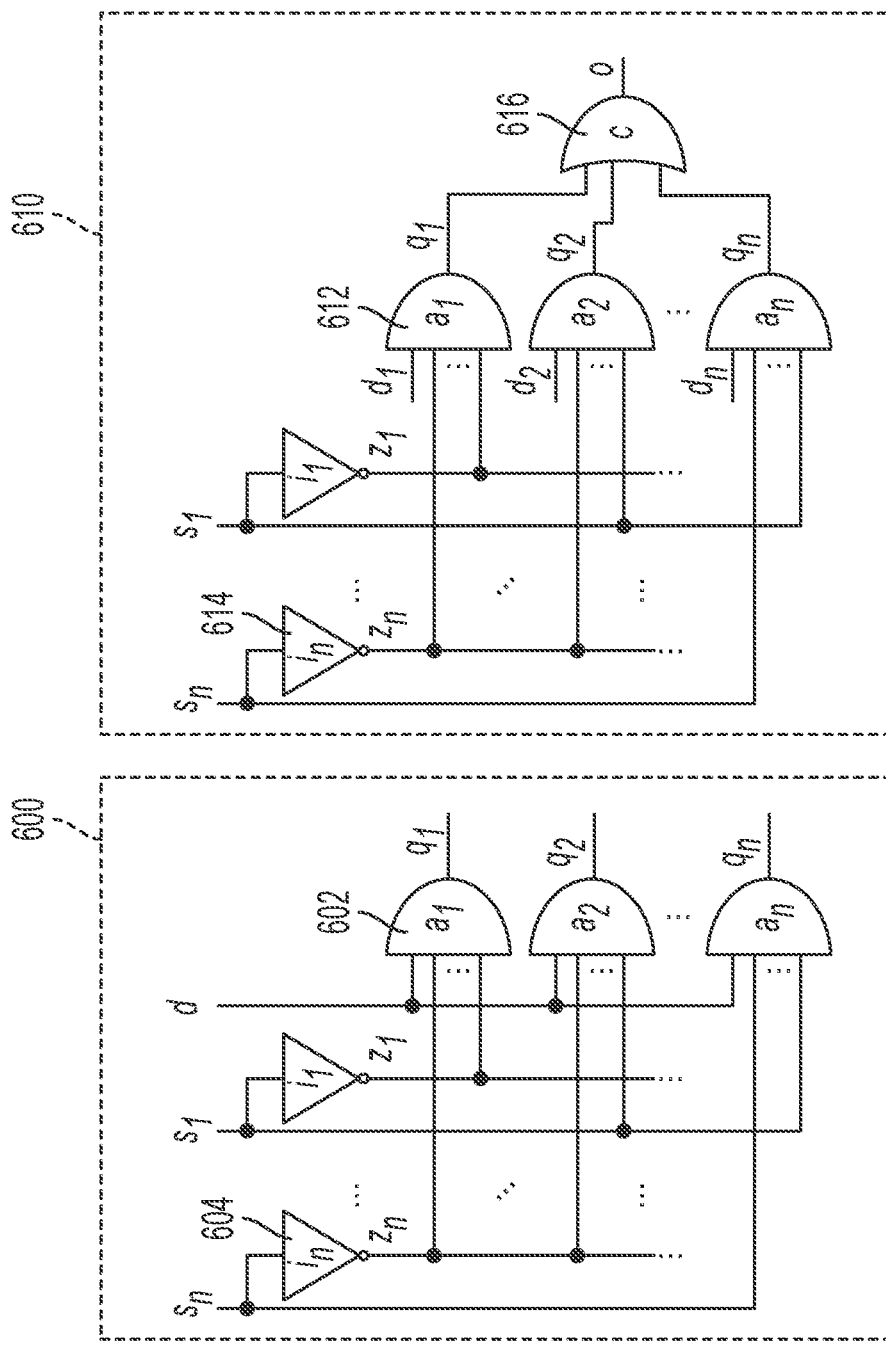
FIG. 6A shows an exemplary demultiplexer used in the universal component cell, according to one embodiment.
FIG. 6B shows an exemplary multiplexer used in the universal component cell, according to one embodiment.

By configuring the demultiplexers and multiplexers, universal component cell 500 can be configured to act as any one of the components included in the universal component cell. The configuration of universal component cell 500 can be a binary value assigned to a vector of selector lines s. The number of selector inputs is $|s|=\lceil \log_2 n \rceil$ for n distinct component types, meaning that the number of items in set s can be given as the smallest integer that is greater than or equal to $\log_2 (n)$ FIG. 6A shows an exemplary demultiplexer used in the universal component cell, according to one embodiment. FIG. 6B shows an exemplary multiplexer used in the universal component cell, according to one embodiment. In the example shown in FIGS. 6A and 6B, there are n different types of gates and $|s|=\lceil \log_2 n \rceil$ selector lines.

Accordingly, demultiplexer 600 and multiplexer 610 can each include n multi-input AND gates (e.g., AND gates 602 and 612) and |s| inverters (e.g., inverters 604 and 614). The number of selector lines can be arbitrary, making it possible for the multiplexer or demultiplexer to work with a component library having an arbitrary number of components. All AND gates can have |s|+1 inputs. In addition to the selector inputs, all of the AND gates of demultiplexer 600 can also include an identical input line d. On the other hand, in addition to the selector inputs, each AND gate of multiplexer 610 can include an individual input line $d_i$, where i=1, 2, . . . , n. Multiplexer 610 can also include an OR gate 616 with n inputs. The space complexity for both demultiplexer 600 and multiplexer 610 is O(|s|×n), when the multi-input gates are realized with ladders of two-input ones.

Because the selector input determines the type of component the universal component cell represents, the assumable inputs for fault can be associated with the selector input depending on the circuit implementation. In addition to the stuck-at faults and the wrong-component-type fault, the system can also model other types of fault, such as the bringing fault or the open-wire fault, using known techniques. The scope of disclosure is not limited by the type of fault being modeled and the particular fault-modeling technique.

Regardless of the type of fault being modeled, at a higher level, the presence of a particular fault can be simulated by assigning appropriate values to the additional assumable inputs in the fault-augmented circuit design (e.g., stuck-at assumable inputs shown in FIGS. 4A and 4B).

In this disclosure, the following notations are used: X denotes the set of primary inputs, Y denotes the set of primary outputs, and F denotes the set of fault-assumable (or assumable for short) inputs; an assignment $f=0$ to a variable $f \in F$ denotes a lack of fault, and an assignment $f=1$ to a variable $f \in F$ denotes the presence of a fault; and an assignment to all primary inputs in a circuit $\varphi(X=\{0,1\}^{|X|}, F=\{0,1\}^{|F|})$ produces an assignment to all primary outputs of $\varphi$. It can be shown that, if the circuit $\varphi$ is well-formed and all primary inputs are assigned, there exists a polynomial-time algorithm that can compute the values of the primary outputs Y.

Given a fault-augmented circuit $\varphi$ with primary inputs X, assumable inputs F, and a fault-assumable variable $f \in F$, a test vector that tests $f$ is defined as an assignment $X=\chi$, such that $\varphi(X=\chi, f=0) \neq \varphi(X=\chi, f=1)$. In other words, a test vector that tests a particular fault is an input that causes the circuit to generate different outputs for the no-fault situation and for the faulty situation. In rare circumstances, a test vector for a particular assumable input $f$ may not exist. However, in this disclosure, it is assumed that there always exists at least one test vector for each assumable input.

Given the circuit $\varphi$ with primary inputs X, assumable inputs F, a test suite $\Lambda$ is a set of test vectors such that, for any $f \in F$, there exists at least one test vector $\chi \in \Lambda$ that tests $f$.

Automated Test Pattern Generation Based on SAT Solver and Miter Circuits

In conventional approaches for automated test pattern generation (ATPG), given a circuit design, the ATPG system generates test vectors for testing faults at one component at a time. Considering modern circuits usually have a large number (sometimes can be trillions) of components, such a test-generation process can be inefficient and time consuming. To increase the test-generation efficiency, in some embodiments, the ATPG system can construct a miter structure and uses a SAT solver to solve a Boolean formula corresponding to the miter in order to generate test patterns for testing a circuit.

The word "miter" is short for "miter joint" and means two parts fastened together. In one miter construct, two (or more) circuits are given the same inputs and their outputs are forced to be different to simulate that a faulty circuit generates different outputs than the no-fault circuit. Encoding the circuit as a Boolean formula and leaving the inputs as unset literals, a SAT solver will find an assignment of binary values to all the input variables. These input values will cause the two circuits to have different outputs, meaning that the SAT solver has found a test-vector that distinguishes the two circuits. On the other hand, if the SAT solver reports UNSAT, then the two circuits are equivalent. Hence, a miter circuit can also be referred to as an equivalence checking circuit.

Figure 7A:
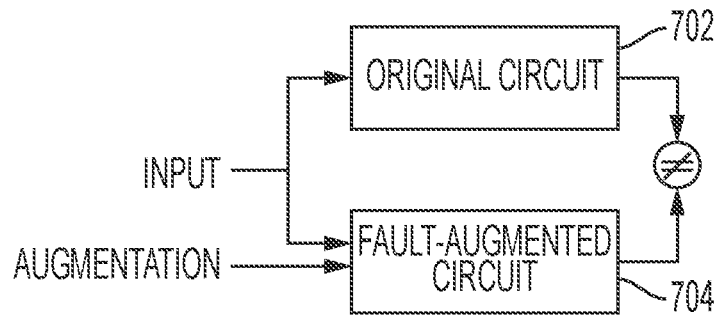
FIG. 7A illustrates an exemplary miter structure used for generating a test vector for a particular fault, according to one embodiment.

FIG. 7A illustrates an exemplary miter structure used for generating a test vector for a particular fault, according to one embodiment. In FIG. 7A, miter structure 700 includes an original circuit 702 and a fault-augmented circuit 704. Original circuit 702 is the no-fault circuit, and fault-augmented circuit 704 can be generated by augmenting original circuit 702 with faults of various types, including but not limited to: stuck-at faults, wrong-component-type faults, bridging faults, and open-wire faults. Note that augmenting an original circuit with faults means inserting the fault-augmentation subcircuits in the original circuit. As shown in FIG. 7A, inputs of original circuit 702 and fault-augmented circuit 704 are coupled to each other (i.e., they are forced to be same). In addition, fault-augmented circuit 704 includes an augmentation input, which can include the aforementioned assumable inputs that cause fault-augmented circuit 704 to exhibit certain fault behavior. To find a test vector that is sensitive to a particular fault, one can configure fault-augmented circuit 704 by inserting the particular fault (e.g., by setting the corresponding assumable input as 1). A SAT solver can then be used to find a test vector sensitive to the fault (i.e., the input values that cause the output of original circuit 702 and the output of fault-augmented circuit 704 to be different). In addition to using the original circuit in the miter, it is also possible to use identical circuit structures (i.e., both circuits are fault-augmented) to form the miter and disable the fault-augmentation input for one of them. It is also possible to fix the test-vector to find fault-augmentations it is sensitive to.

Figure 7B:
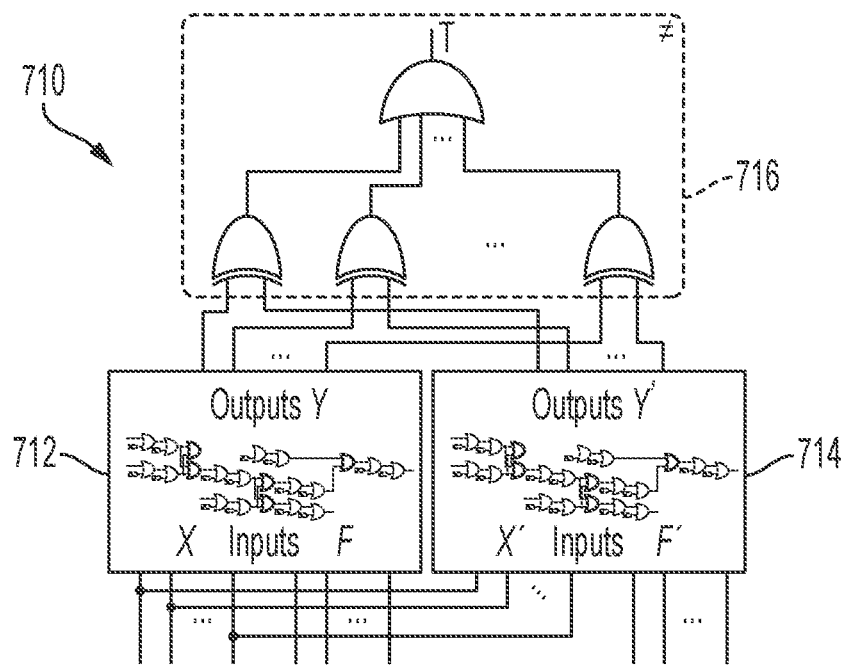
FIG. 7B illustrates an exemplary implementation of using a miter structure to generate test vectors, according to one embodiment.

FIG. 7B illustrates an exemplary implementation of using a miter structure to generate test vectors, according to one embodiment. In FIG. 7B, test-generating circuit 710 includes an original circuit 712, a fault-augmented circuit 714, and an output-comparison circuit 716. Both original circuit 712 and fault-augmented circuit 714 include a set of primary inputs (X and X', respectively) and a set of assumable inputs (F and F', respectively). Note that the assumable inputs of original circuit 712 are set as zeros, meaning no fault is included, whereas at least one of the assumable inputs of fault-augmented circuit 714 is non-zero. In the example shown in FIG. 7B, circuits 712 and 714 can be similar to the full-adder circuit with fault augmentation shown in FIG. 4C. In practice, the type and structure of the circuits can be arbitrary.

Output-comparison circuit 716 can compare the outputs of original circuit 712 and fault-augmented circuit 714. More specifically, Output-comparison circuit 716 can include a number of XOR gates for comparing individual pairs of outputs and an OR gate taking the outputs of the XOR gates as inputs. Any mismatch between the outputs of original circuit 712 and the outputs of fault-augmented circuit 714 can result in the output of output-comparison circuit 716 being "TRUE" or "1."

As discussed previously, to compute a test vector for a particular fault $f$, one can assign a Boolean vector where the only non-zero element is $f$ to F' and use a SAT solver to compute values for X such that the output of output-comparison circuit 716 is TRUE. The computed values of X are the desired test vector that can be used to test the particular fault $f$. To compute a test suite, one can use the SAT solver to find a solution for each fault location/assumable input to obtain n test vectors, where n=|F|. Note that some of the test vectors may be the same, meaning that the same test vector can be used to test different faults. In such a situation, the test suite is considered as compacted. A compacted test suite can reduce the number of test vectors needed for testing a circuit, thus decreasing the overall time needed for testing. It is desirable to generate a test suite that is compacted or having a reduced number of test vectors.

In some embodiments, in addition to a test vector for testing for a single-fault (i.e., fault at a single component or location) one location at a time, the system can also compute a single test vector that can test multiple single-faults in one run. More specifically, to do so, the constructed miter structure will have multiple fault emulation circuits (i.e., the fault-augmented circuit). For example, to generate a test vector that can test two single-faults, the miter structure can include three circuits: the original (or no-fault) circuit and two fault-augmented circuits, one for each single-fault. Note that a test vector that tests multiple single-faults is different from a test vector that tests multiple faults. In examples described in this disclosure, the system generates test vectors that can be used to test single-faults. However, the similar concept can also be used to develop a strategy for generating test vectors that can test multiple faults (e.g., double faults).

Figure 8A:
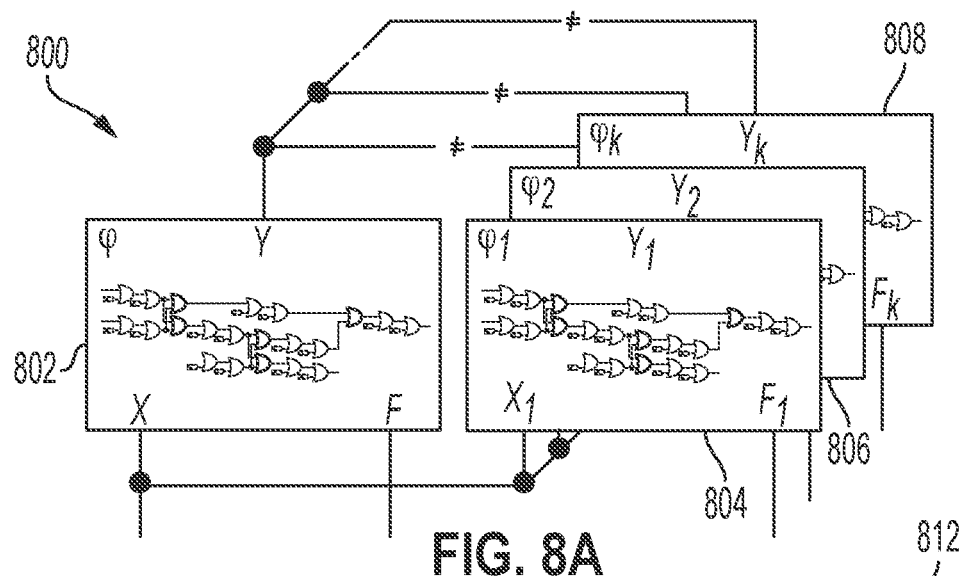
FIG. 8A illustrates an exemplary miter structure used for generating a test vector for testing multiple single-faults, according to one embodiment.

FIG. 8A illustrates an exemplary miter structure used for generating a test vector for testing multiple single-faults, according to one embodiment. More specifically, miter structure 800 includes a number circuit blocks, including an original circuit block 802 and k fault-augmented circuit blocks (e.g., circuit blocks 804, 806, and 808). In other words, miter structure 800 includes k miters or miter blocks, with each miter including original circuit block 802 and one fault-augmented circuit block. Note that original circuit block 802 can be denoted as $\varphi(X=\{0,1\}^{|X|}, Y=\{0,1\}^{|Y|}, F=0)$, and an $i_{th}$ fault-augmented circuit block can be denoted as $\varphi_i(X_i=\{0,1\}^{|X_i|}, Y=\{0,1\}^{|Y|}, F_i=\{0,1\}^{|F_i|})$. Similar to the test-generating circuit shown in FIG. 7B, the inputs of all the circuit blocks are coupled to each other. For simplicity of illustration, the comparison circuit is not shown in detail here, and the "≠" symbols coupling the outputs of original circuit 802 to the outputs of each individual fault-augmented circuit block indicate that the outputs of original circuit 802 and the outputs of each individual fault-augmented circuit block are forced to be different. This way, the input values that are the satisfying solution to the Boolean formula representing miter structure 800 form a test vector that can test all k faults. Note that, although FIG. 8A shows the fault-augmented circuit blocks being identical (e.g., they are all inserted with the stuck-at-fault-augmentation subcircuits), in practice, the fault-augmented circuit blocks may be inserted with subcircuits of different types of fault (e.g., stuck-at fault, wrong-component type fault, bridging fault, and open-wire fault).

In some embodiments, the assumable inputs can have pre-assigned values to represent certain faults (e.g., a particular non-zero $f$ represents a fault at a particular component or location). In some embodiments, there can be no values assigned to the assumable inputs, and the SAT solver not only can find a test vector $\chi$ but also can find values of the unassigned variables in F (i.e., which faults can be tested using $\chi$). In other words, without defining the fault locations ahead of time, the SAT solver can find a test vector and the corresponding faults that can be tested by the test vector. To do so, extra cardinality constraints are needed. More specifically, these constraints can guarantee the type of faults tested by the computed test vector. In some embodiments, the test-generating system generates test vectors that test single-faults, and constraints can be applied to the assumable inputs such that there is only one non-zero $f$ in F.

Figure 8B:
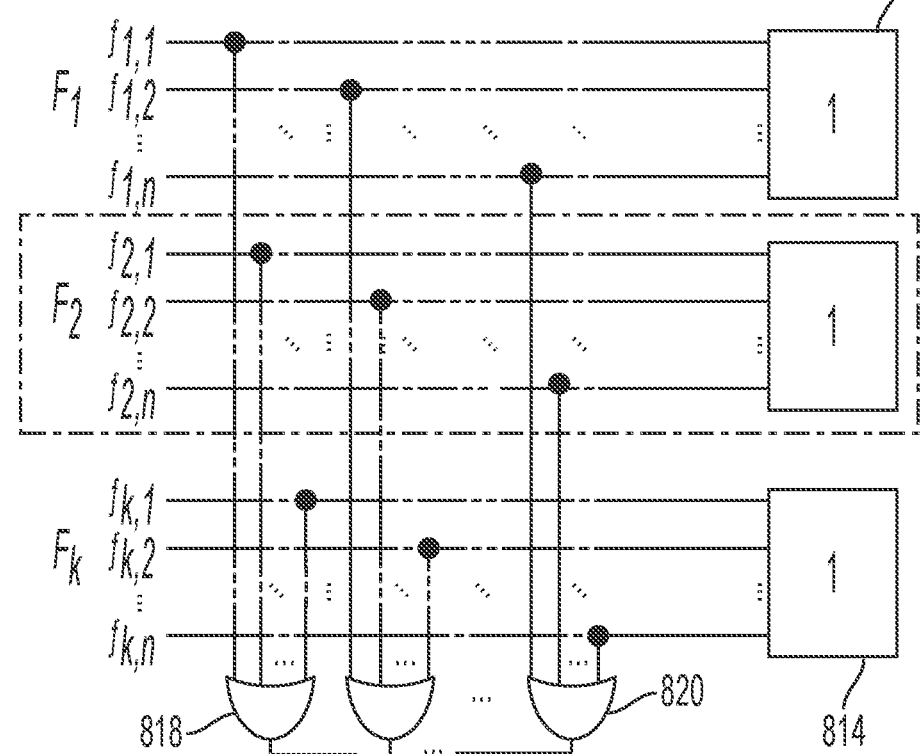
FIG. 8B illustrates the constraint portion of the test-generating circuit, according to one embodiment.

FIG. 8B illustrates the constraint portion of the test-generating circuit, according to one embodiment. More specifically, FIG. 8B shows the coupling among the assumable inputs (i.e., $F_1, F_2, \ldots F_k$) and the constraints applied to them. As discussed previously, for each $F_i$, there is a "one" constraint, meaning that among all $f$s in $F_i$ (e.g., $f_{i,j}(1 \le j \le n)$, where n can be the number of locations or components of potential faults in the circuit) there exists only one non-zero component or $f$. For example, all components of the assumable input $F_1$ (which is shown in FIG. 8A as being coupled to circuit block 804) are coupled to a constraint circuit 812, which applies the "one" constraint to $F_1$. Similarly, all components of the assumable input $F_k$ are coupled to a constraint circuit 814, which applies the "one" constraint to $F_k$. For multiple faults, the constraint can be a "k" constraint, with k being an integer greater than one. For example, a "two" constraint means that the generated test vector can be used to test a double-fault in the circuit. Note that single-faults are more common in circuits than double-faults.

To ensure that each fault-augmented circuit can be used to test a unique fault (i.e., different circuit blocks have different assumable inputs), an additional constraint is needed. FIG. 8B also shows that the corresponding components of all $F_i(1 \le i \le k)$ are coupled to an OR gate and the outputs of the n OR gates are coupled to an "exactly k" constraint circuit 816. For example, all of the $f_{i,1}(1 \le i \le k)$ are coupled to OR gate 818, and all of the $f_{i,n}(1 \le i \le k)$ are coupled to OR gate 820. Outputs of OR gates 818 and 820 along with outputs of the other OR gates are coupled to constraint circuit 816, which applies the "exactly k" constraint.

There are various known techniques for implementing the "one" and "exactly k" constraints. In fact, the "one" constraint can be viewed as a special case for the "exactly k" constraint. Exemplary constraint circuits can include at-least one and at-most one combination of AND gates and OR gates, multi-operand adders, and sorting networks.

Figure 9A:
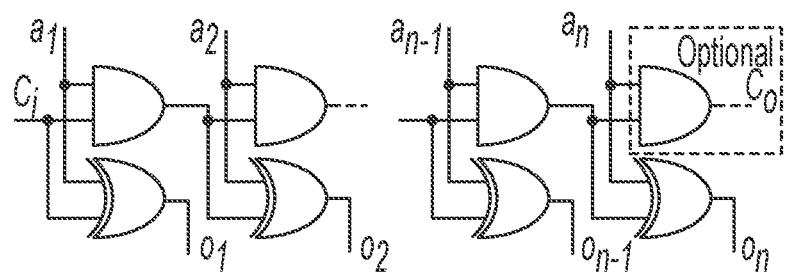
FIG. 9A illustrates an implementation of a full adder, according to one embodiment.
Figure 9B:
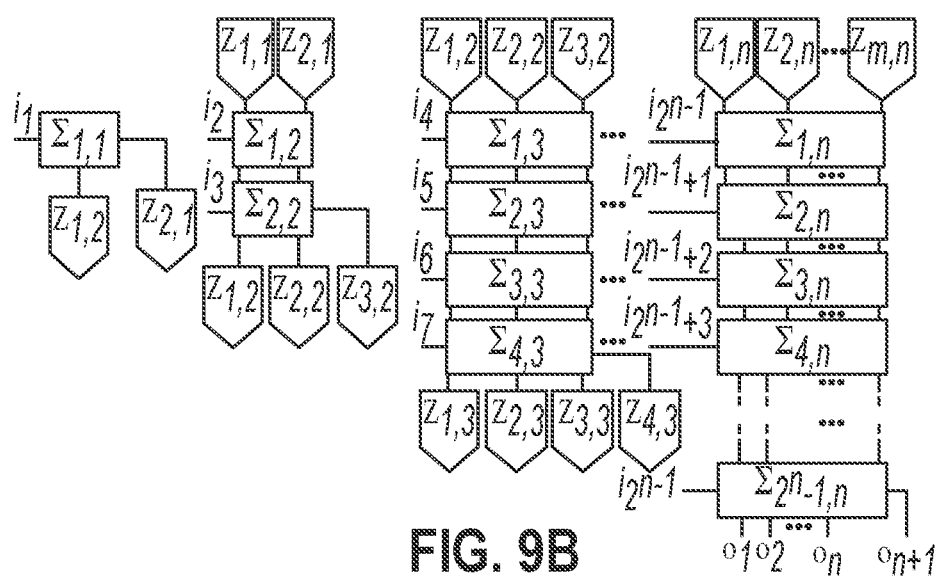
FIG. 9B illustrates an exemplary multi-operand adder, according to one embodiment.

An n-bit multi-operand adder circuit adds n single-bit numbers. Multi-operand addition of single-bit numbers is also known as bit-counting or binary vector addition and has found applications in circuit implementations of the "at least k" or "at most k" constraints. FIG. 9A illustrates an implementation of a full adder, according to one embodiment. A full-adder adds one bit to a binary number and consists of n half-adders, where n equals the number of bits necessary for representing the binary number. The full-adders can be implemented without a carry-out bit, which saves one AND-gate. FIG. 9B illustrates an exemplary multi-operand adder, according to one embodiment. In FIG. 9B, the multi-operand adder is implemented as a chain of multi-operand full-adders. More specifically, the multi-operand adder uses full-adders (e.g., adders similar to the one shown in FIG. 9A) of increasing size. The first adder has one input, the second and third adders each have two inputs, the next four adders each have three inputs, etc. The size of the multi-operand adder grows polynomially with the number of inputs. Considering a multi-operand adder with n outputs and $2^n-1$ inputs where n∈□, the number of gates necessary for implementing this multi-operand adder is $2^{n+1}$ (n−2)+$2^n$−n+ 3.

Figure 10:
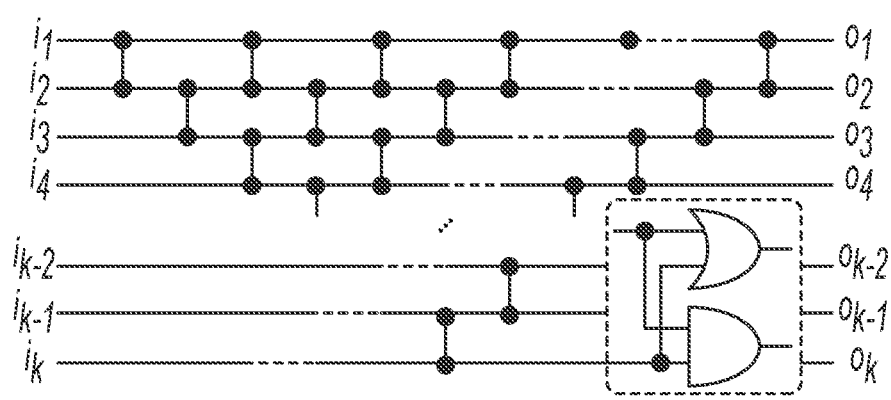
FIG. 10 illustrates an insertion-based sorting network, according to one embodiment.

Under certain circumstances, it is more computationally advantageous to use unary instead of binary arithmetic. In such situations, the multi-operand adder described above can be replaced by a sorting-network. FIG. 10 illustrates an insertion-based sorting network, according to one embodiment.

Implementations provide different trade-offs between circuit size (number of wires and gates), circuit depth (the longest directed path from a primary input to a primary output), and structure. The choice of a cardinality constraint circuit can impact the performance of the underlying SAT solver. The scope of this disclosure is not limited by the type of constraint circuit being implemented.

Figure 11A:
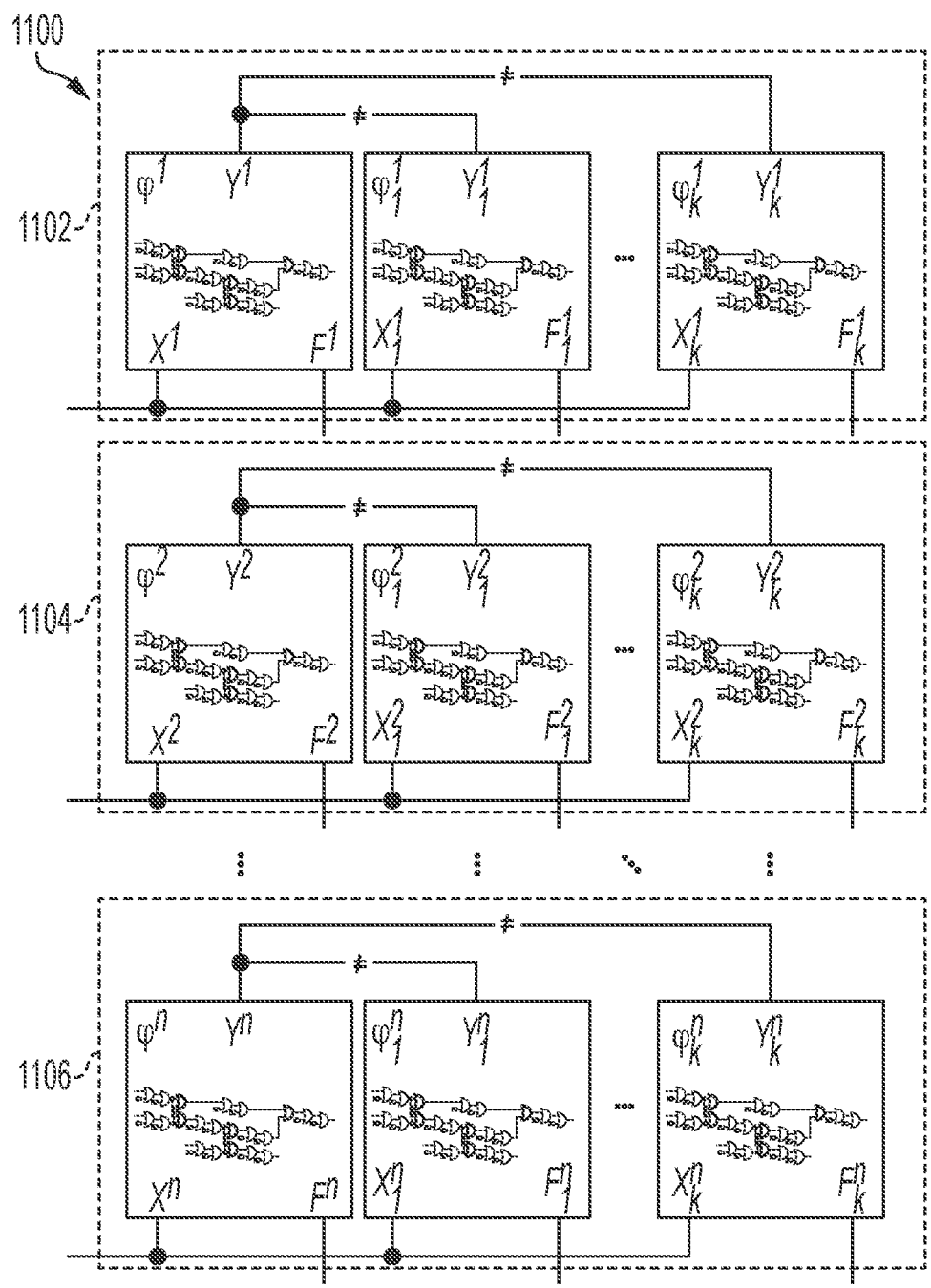
FIG. 11A illustrates a test-generating circuit comprising a plurality of miter structures, according to one embodiment.

In addition to being able to generate a test vector for multiple single-faults in one iteration (i.e., running the SAT solver once), it is also possible to generate an entire test suite that can test all possible single-faults in a circuit by running the SAT solver once. To do so, the miter structure shown in FIG. 8A can be expanded to include multiple rows, with each row comprising k fault-augmented circuit blocks for generating a test vector that tests multiple single-faults. FIG. 11A illustrates a test-generating circuit comprising a plurality of miter structures, according to one embodiment. In FIG. 11A, test-generating circuit 1100 includes a number (e.g., n) of miter rows, such as miter rows 1102, 1104, and 1106. Each miter row can be similar to the structure shown in FIG. 8A and can include the original circuit and a plurality of fault-augmented circuits, with the original circuit and the fault-augmented circuit forming a miter. In FIG. 11A, each miter row can include k miters. Miter row 1102 can include an original circuit denoted as $\varphi^1(X^1=\{0,1\}^{|X^1|}, Y^1=\{0,1\}^{|Y^1|}, F^1=0)$ and k fault-augmented circuit each denoted as $\varphi_i^1$ $(X_i^1=\{0,1\}^{|X_i^1|}, Y_i^1=\{0,1\}^{|Y_i^1|}, F_i^1\{0,1\}^{|F_i^1|})$, 1≤i≤k. Similarly, miter row 1106 can include an original circuit denoted as $\varphi^n(X^n=\{0,1\}^{|X^n|}, Y^n=\{0,1\}^{|Y^n|}, F^n=0)$ and k fault-augmented circuit each denoted as $\varphi_i^n(X_i^n=\{0,1\}^{|X_i^n|}, Y_i^n=\{0,1\}^{|Y_i^n|}, F_i^n=\{0,1\}^{|F_i^n|})$, 1≤i≤k. Note that although the original circuits in each row are represented using different notations, they are in fact identical and $F^1=F^2=\ldots=F^n=0$.

Figure 11B:
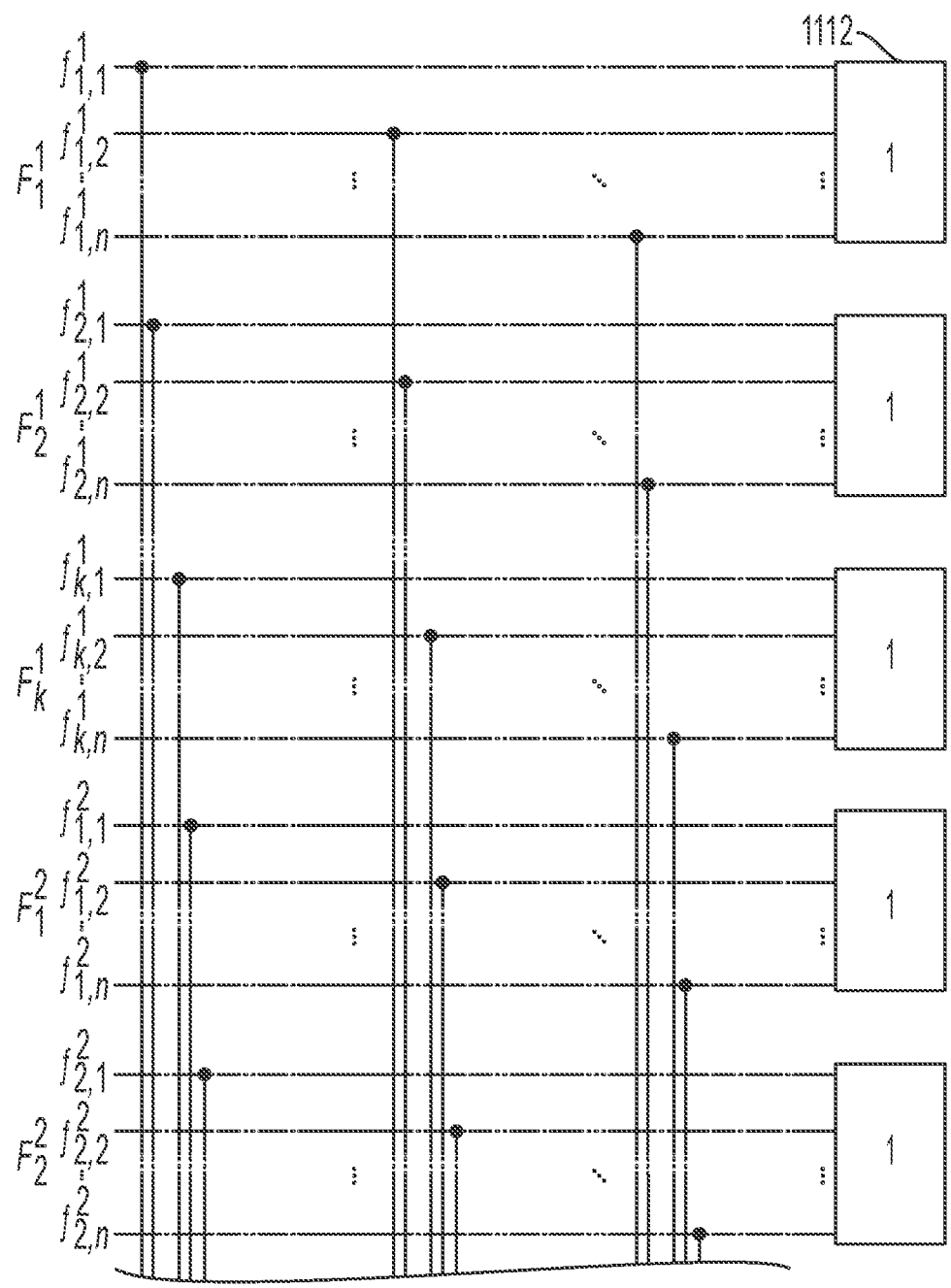
FIG. 11B illustrates the constraint portion of the test-generating circuit, according to one embodiment.
Figure 11B:
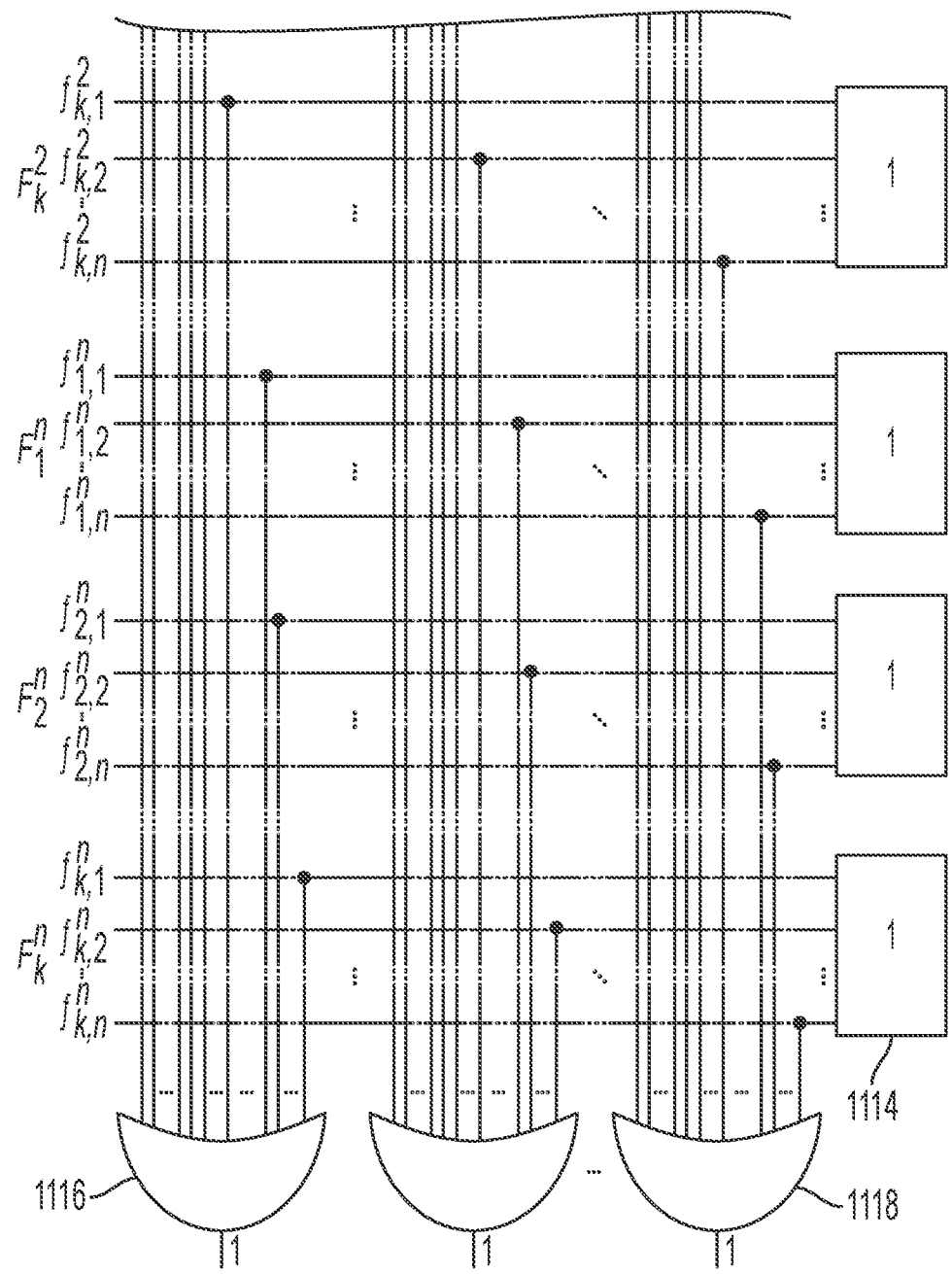

FIG. 11B illustrates the constraint portion of the test-generating circuit, according to one embodiment. In FIG. 11B, similar to what is shown in FIG. 8B, the assumable inputs of each augmented circuit block are coupled to a "one" constraint circuit, meaning that only one component in F is non-zero. For example, all components of $F_1^1$ (i.e., all $f_{1,j}^1$(1≤j≤n)) are coupled to "one" constraint circuit 1112, and all components of $F_k^n$ (i.e., all $f_{k,j}^n$(1≤j≤n)) are coupled to "one" constraint circuit 1114.

In addition to the "one" constraint applied to each fault-augmented circuit block, another constraint can be added to ensure that there is a test vector for each fault variable or for a subset of the fault variables. Such a constraint is applied by a number of OR gates coupled to the corresponding assumable inputs of each fault-augmented circuit block, regardless of to which row it belongs. In other words, all j-th assumable inputs of all fault-augmented circuit blocks are coupled to the same j-th OR gate. Because there are n×k fault-augmented circuit blocks, each OR gate has n×k inputs. For example, the first assumable inputs of all fault-augmented circuit blocks, including all $f_{i,1}^l$(1≤i≤k, 1≤l≤n), are coupled to first OR gate 1116, with the output of OR gate 1116 being fixed as 1, meaning that at least one of the $f_{i,1}^l$(1≤i≤k, 1≤l≤n) is 1. Similarly, the last assumable inputs of all fault-augmented circuit blocks, including all $f_{i,j}^l$ (1≤i≤k, 1≤j≤n, 1≤l≤n), are coupled to last OR gate 1118. The idea for implementing these OR gates is that each fault variable $f_{i,j}^l$(1≤i≤k, 1≤j≤n, 1≤l≤n) must be tested by a fault-augmented circuit block, and it does not matter by which exactly.

Given the multiple rows of miter structures and the constraints, a SAT solver can find a satisfying solution for the Boolean formula representing the multiple rows of miter structures. The solution includes assignments to the primary inputs of the original circuit at each row (e.g., $X^1$, $X^2$, ..., or $X^n$), which corresponds to a test vector, and the test vectors obtained from the different rows form a complete test suite.

In the examples shown in FIGS. 8A-8B and FIGS. 11A-11B, there is no limitation in the number of fault-augmented circuit blocks in each row and the number of rows. In practice, depending on the structure of the original circuit, the number of single-faults that can be tested by a single test vector can have a certain maximum value. Such a value can be higher for more redundant circuits. For example, for a particular circuit, one may only be able to find a test vector that can test up to 10 different single-faults. When the miter structure shown in FIG. 8A includes 11 fault-augmented circuit blocks, the SAT solver will fail to find a satisfying solution. On the other hand, more miter rows in FIG. 11A can generate more test vectors, due to the relaxed constraint (e.g., there is no longer the "exactly k" constraint). However, some test vectors may end up testing the same fault. As discussed previously, to increase the testing efficiency, it is desirable to have a compacted test suite; that is, a particular fault is only tested by just one test vector. To do so, in some embodiments, the test-generating circuit (e.g., the one shown in FIG. 11A) is constructed strategically, such that it has a maximum number of fault-augmented circuit blocks in each row and a minimum number of rows. This way, the SAT solver can generate an optimum test suite (i.e., a test suite having a minimum number of test vectors) for testing a circuit.

Figure 12:
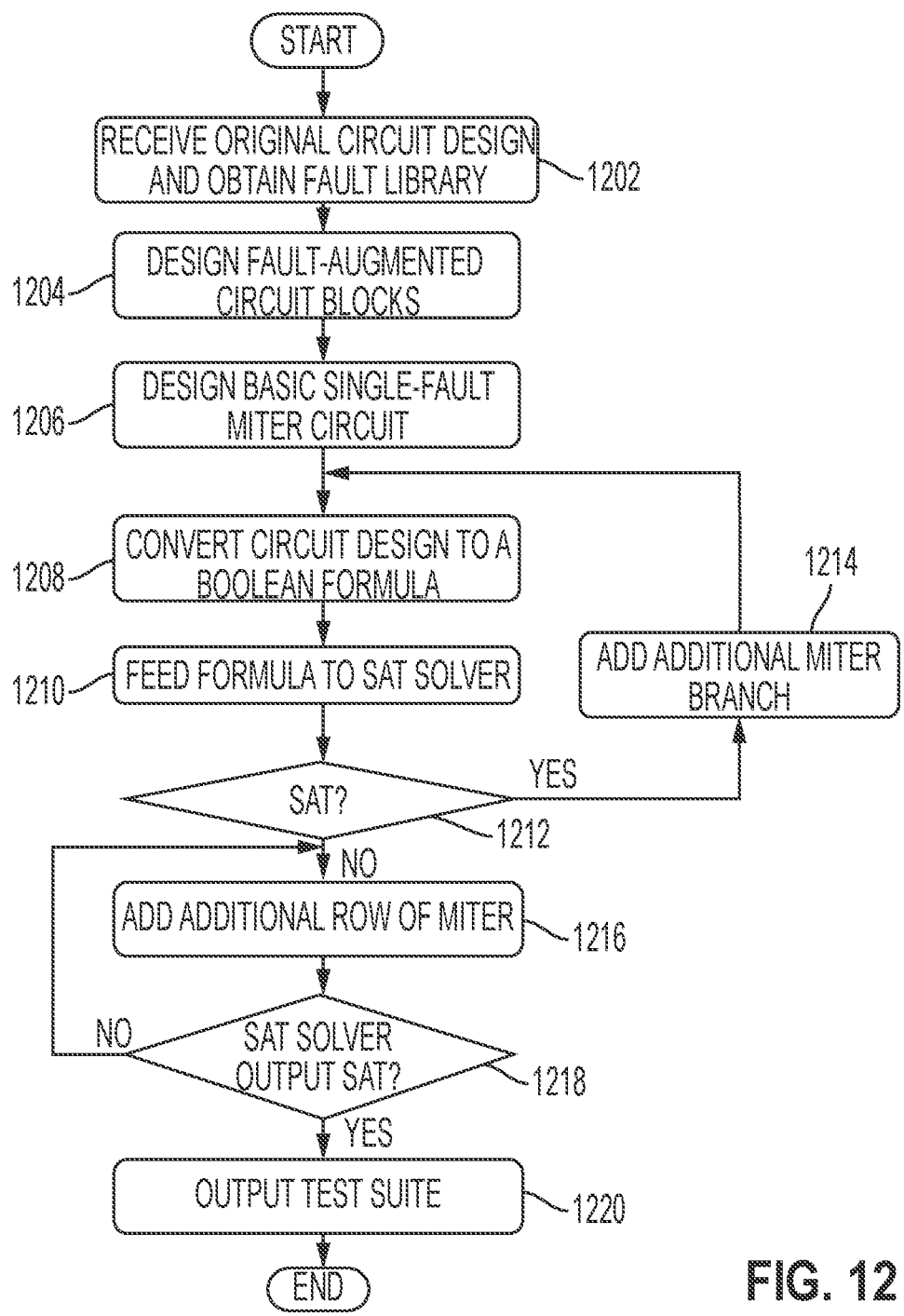
FIG. 12 presents a flowchart illustrating an exemplary process for generating a test suite, according to one embodiment.

FIG. 12 presents a flowchart illustrating an exemplary process for generating a test suite, according to one embodiment. During operation, the test-generating system receives an original circuit design and obtains a pre-established fault library (operation 1202). The received original circuit design is assumed to have no fault (i.e., it is properly designed) and can be in the form of a hardware layout or a netlist. The fault library can include descriptions of subcircuits for emulating different types of fault, including but not limited to: stuck-at fault, wrong-component-type fault, bridging fault, and open-wire fault.

The system can then design various fault-augmented circuit blocks (which are the basic building blocks of the test-generating circuit design) (operation 1204). In some embodiments, designing a fault-augmented circuit block comprises inserting an augmentation subcircuit (e.g., a stuck-at-fault-augmentation subcircuit) at the output of each gate in the original circuit and at each primary input of the original circuit (e.g., as shown in FIG. 4C). The system can then design a basic single-fault miter circuit (operation 1206). The basic single-fault miter circuit design can be similar to a design of circuit 710 shown in FIG. 7B and can be used to generate test vectors that test a single-fault. More specifically, the basic single-fault miter circuit design can be constructed by connecting the inputs of the original circuit to the corresponding inputs of a fault-augmented circuit block. The outputs of the original circuit and the outputs of the fault-augmented circuit block are sent to a comparison circuit, and the output of the comparison circuit has a given value to indicate that the outputs of the two circuits are different. The design of the single-fault miter circuit can also include a constraint circuit that applies a constraint (e.g., the "one" constraint) to the assumable inputs of the fault-augmented circuit block.

The system can then convert the circuit design to a Boolean formula (operation 1208) and feed the Boolean formula to a SAT solver (operation 1210). In some embodiments, the Boolean formula can be converted to a standard form such as the Conjunction Normal Form (CNF) to allow a standard SAT solver (e.g., one based on the Davis-Putnam-Logemann-Loveland (DPLL) algorithm) to find a satisfying solution to the Boolean formula, given the constraint. The system determines whether the SAT solver can find a satisfying solution for the Boolean formula given the constraint (operation 1212). If the SAT solver finds a satisfying solution, the system can then add an additional branch (i.e., another fault-augmented circuit block coupled to the original circuit) to the miter structure design (operation 1214) and convert this extended circuit design to a Boolean formula (operation 1208). If the SAT solver returns UNSAT, meaning that the number of fault-augmented circuit blocks in the single-fault miter circuit design has reached its maximum value, adding additional branches in the same row can no longer increase the cardinality of the test vector.

In response to the SAT solver outputting UNSAT for the miter circuit design, the system can relax the constraint by adding an additional row of miter structure (operation 1216). The system also modifies the design of the constraint circuit (e.g., replacing the "exactly k" constraint with OR gates). The expanded circuit design, including the modified constraint circuit design, can be similar to the designs of circuits shown in FIG. 11A and FIG. 11B. The system subsequently determines whether the SAT solver can find a satisfying solution for the circuit design with the additional row(s) (operation 1218). If not, the system continues to add an additional row of miter structure (operation 1216). If the SAT solver outputs a satisfying solution, the system outputs the test suite (operation 1220). More specifically, the satisfying assignments to the primary inputs of each rows of the expanded miter circuit design form a complete test suite that can test each and every component/fault location within the original circuit design.

The test suite can then be used by a testing system to test the physical circuits fabricated according to the design of the original circuit. For example, the testing system can use the test vectors as inputs to test the physical circuit. By comparing the outputs of the physical circuit responsive to a test vector to the predetermined outputs (i.e., outputs of the original, no-fault circuit responsive to the test vector), the system can determine whether the physical circuit contains a fault. Moreover, the particular test vector used as the circuit input can indicate the location and/or type of the fault. Because a single test vector may be used to test multiple single-faults, after identifying the test vector leading to the fault, additional testing may be needed to pinpoint the fault location. As discussed previously, the test suite generated using the process shown in FIG. 12 is optimum, meaning that it contains a minimum number of test vectors that can test each and every component in the circuit. A smaller test suite can reduce the amount of time used for testing, thus significantly increasing the test efficiency. For example, if no fault is identified by using every test vector in the test suite as circuit input, the circuit is determined to have no fault.

Figure 13:
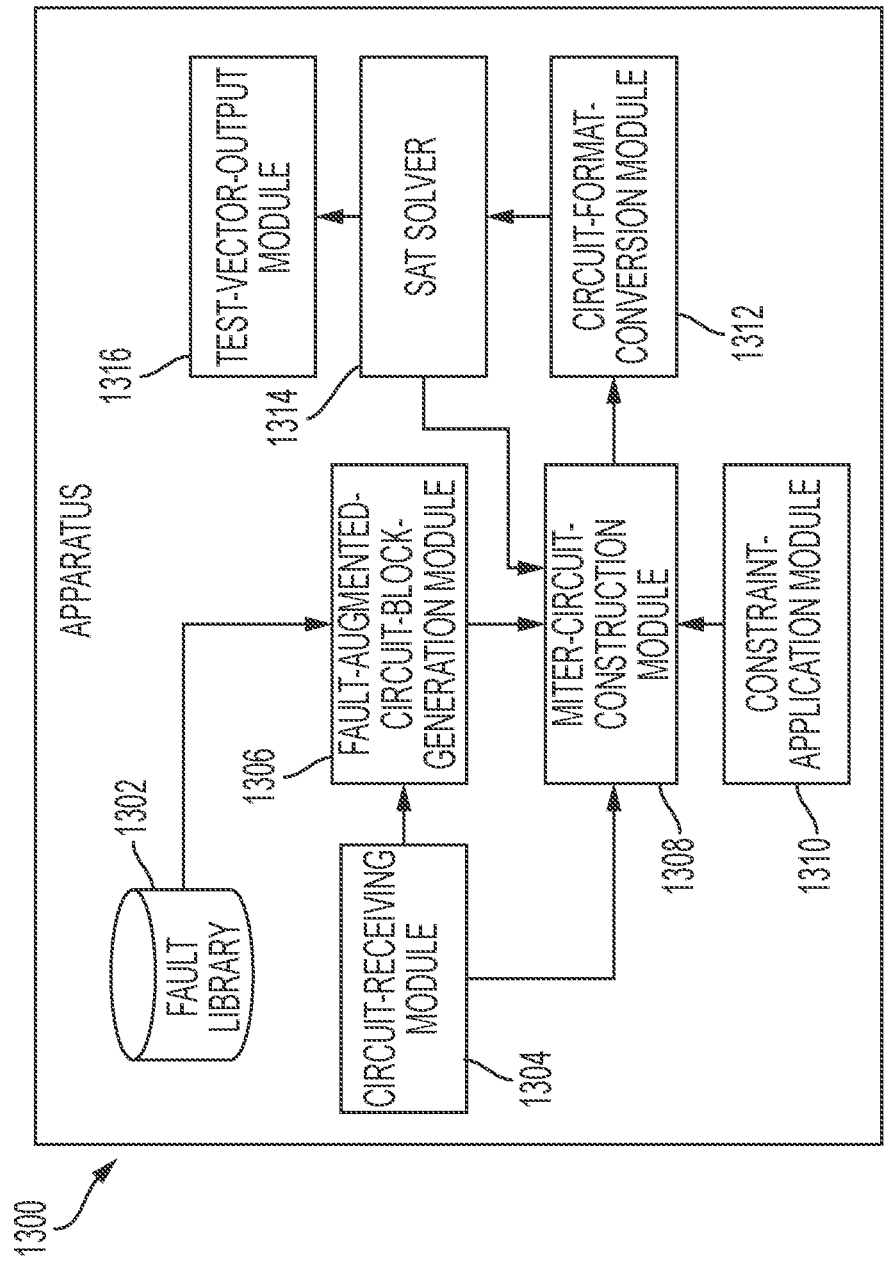
FIG. 13 presents an exemplary apparatus for generating test vectors, according to one embodiment.

FIG. 13 presents an exemplary apparatus for generating test vectors, according to one embodiment. Apparatus 1300 includes a fault library 1302, a circuit-receiving module 1304, a fault-augmented-circuit-block-generation module 1306, a miter-circuit-construction module 1308, a constraint-application module 1310, a circuit-format-conversion module 1312, a SAT solver 1314, and a test-vector-output module 1316.

Fault library 1302 stores the fault-augmented subcircuits for various types of fault, including but not limited to: the stuck-at fault, the wrong-component-type fault, the bridging fault, and the open-wire fault. Circuit-receiving module 1304 receives the original, no fault circuit design. In some embodiments, circuit-receiving module 1304 can receive the design (e.g., the layout) of the circuit, and the to-be-tested physical circuits are manufactured according to the design. In alternative embodiments, the received circuit design can be in the form of a netlist that includes a list of components in the circuit and a list of the nodes to which they are connected. In addition to a digital circuit, circuit-receiving module 1304 can receive the design of a physical system or a computational system of a different type, such as a mechanical system, an analog circuit, an electro-optical system, an electro-mechanical system, a processor, a reversible computing circuit, a quantum circuit, an optical circuit, a quantum optical circuit, a computer program, etc. Depending on the types of physical system, the received design can have different formats. For example, for a mechanical or an optical system, the design can be a model (e.g., a mathematical model) of the system; and for a computer program, the design can be logic expressions. In addition, depending on the type of physical system being tested, fault library 1302 can include different types of faults.

Fault-augmented-circuit-block-generation module 1306 can generate designs of fault-augmented circuit blocks, which are the basic building blocks of a composite circuit that can be used to generate test vectors. In some embodiments, to ensure that each and every component in the circuit design can be tested for a particular type of fault (e.g., the stuck-at fault), fault-augmented-circuit-block-generation module 1306 can attach the fault-augmented subcircuit to each and every component and to each and every primary input. More specifically, to emulate the wrong-component-type faults, fault-augmented-circuit-block-generation module 1306 can replace each component in the circuit design with a universal component cell similar to the one shown in FIG. 5. The selector inputs used to determine the component type can be controlled by the fault-assumable inputs to simulate the effect of the fault.

Miter-circuit-construction module 1308 can generate a miter circuit design based on the original circuit design and designs of the fault-augmented circuit blocks. More specifically, miter-circuit-construction module 1308 can design a miter by pairing the original circuit with a fault-augmented circuit block and form a miter structure by coupling the one or more miters. Depending on its application (i.e., whether it is used to generate a test vector that tests one single-fault or a test vector that tests multiple single-faults), a miter structure design can include one or more fault-augmented circuit blocks (e.g., similar to the ones shown in FIG. 4B and FIG. 8A, respectively). Moreover, miter-circuit-constructing module 1308 can also construct a large miter circuit design that includes multiple miter rows (e.g., similar to the large circuit shown in FIG. 11A), with each miter row comprising one or more coupled miters. The large miter circuit design can be used to generate an entire test suite.

Constraint-application module 1310 can apply the appropriate constraints (e.g., the "one" constraint or the "exactly k" constraint) to the miter circuit design(s) constructed by the miter-circuit-constructing module 1308. Circuit-format-conversion module 1312 can convert the miter circuit design(s) along with the constraints to a Boolean formula. In some embodiments, the Boolean formula can be in the CNF form. SAT solver 1314 solves the Boolean formula by finding a satisfying solution. If no satisfying solution is found, SAT solver 1314 returns UNSAT. In some embodiments, SAT solver 1314 can work in tandem with miter-circuit-construction module 1308 to construct a miter circuit design that can be used to generate an optimum test suite for a particular circuit. More specifically, when such a constructed miter circuit design is fed to the SAT solver, the SAT solver can find a satisfying solution, which includes all the test vectors in the test suite. More particularly, the optimum test suite can include a minimum number of test vectors that can be used to test each and every component in the particular circuit.

Test-vector-output module 1316 can output the test vectors or test suite. In some embodiments, the test vectors or test suite can be sent to testing equipment, which can then use the test vectors as inputs to test physical circuits fabricated according to the design. By using the test vectors as inputs to a physical circuit and observing its outputs, the testing equipment can determine whether the physical circuit contains fault.

Compared with other schemes for generating test vectors, the disclosed solution provides a number of advantages. First, compared with traditional approaches that only generate test vectors for stuck-at faults, the disclosed approach can generate test vectors for arbitrary faults. More specifically, the system can include a fault library that includes designs of various fault-augmentation subcircuits for emulating the various types of fault.

Second, by constructing a circuit design comprising multiple rows of miter structures, the system can use a single unchanged encoding to find all test vectors for testing a circuit by running the SAT solver just once. In addition to testing physical circuits according to the design, the proposed solution can also be easily expanded to detect and correct design errors.

In the examples used in the disclosure, the circuits or systems under testing are digital circuits. In practice, it is not necessary for the system model to be Boolean, the disclosed testing method and testing system can be applied to any system with inputs and outputs that can be described in propositional logic. For example, in addition to digital circuits, this technique can also be used to generate test vectors for testing other types of computational systems, such as reversible computing circuits, quantum circuits, optical circuits comprising optical gates, quantum optical circuits, processors, computer programs, etc.

Figure 14:
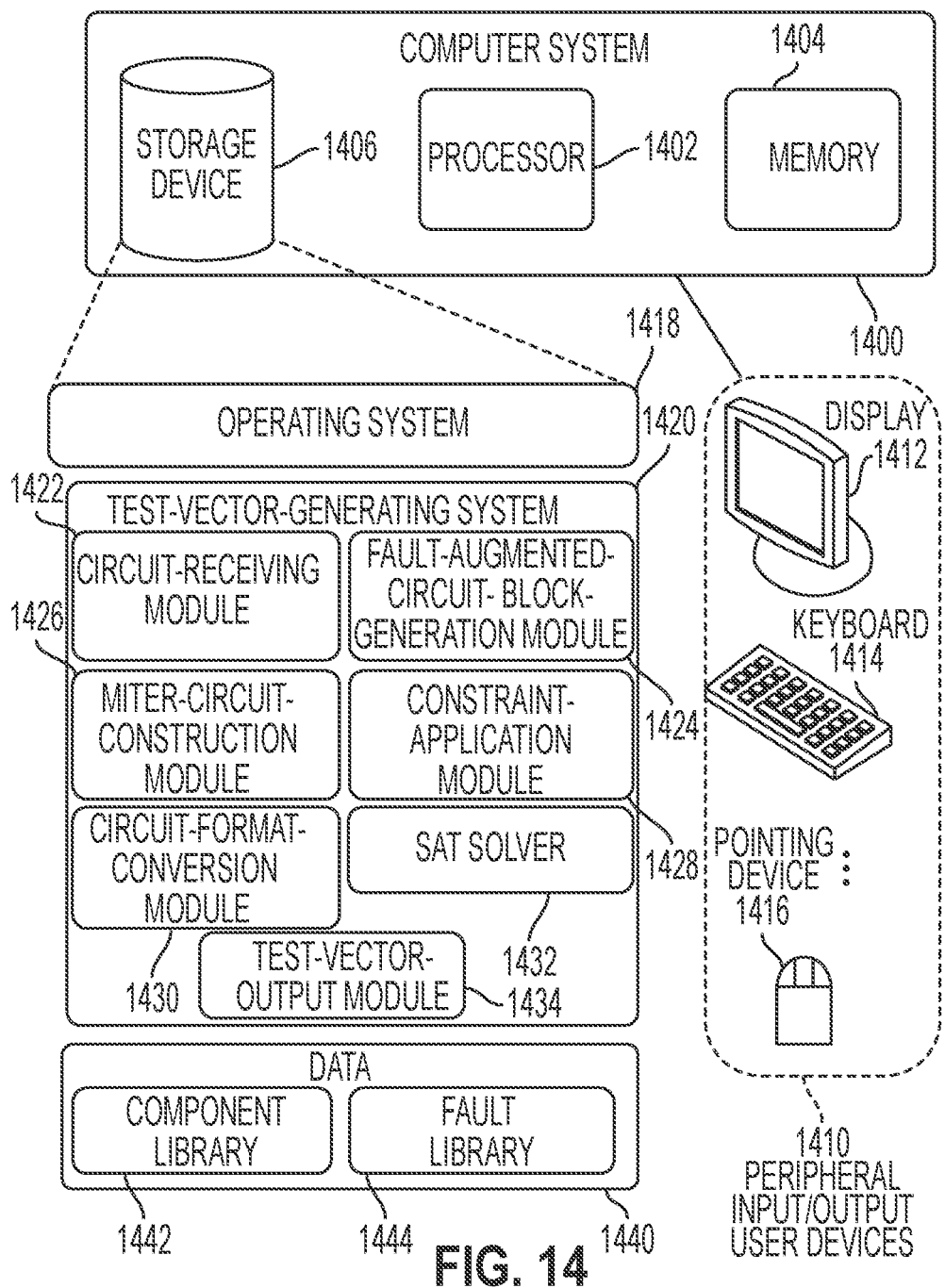
FIG. 14 illustrates an exemplary computer and communication system that facilitates generating test vectors, according to one embodiment.

FIG. 14 illustrates an exemplary computer and communication system that facilitates generating test vectors, according to one embodiment. Computer system 1400 includes a processor 1402, a memory 1404, and a storage device 1406. Furthermore, computer system 1400 can be coupled to peripheral input/output (I/O) user devices 1410, e.g., a display device 1412, a keyboard 1414, and a pointing device 1416. Storage device 1406 can store an operating system 1418, a test-vector-generating system 1420, and data 1440.

Test-vector-generating system 1420 can include instructions, which when executed by computer system 1400, can cause computer system 1400 or processor 1402 to perform methods and/or processes described in this disclosure. Specifically, test-vector-generating system 1420 can include instructions for receiving an original, no-fault circuit design (circuit-receiving module 1422), instructions for generating designs of fault-augmented circuit blocks (fault-augmented-circuit-block-generation module 1424), instructions for constructing miter circuit design(s) (miter-circuit-construction module 1426), instructions for applying constraints (constraint-application module 1428), instructions for converting the circuit design(s) to a Boolean formula (circuit-format-conversion module 1430), instructions for implementing a SAT solver (SAT solver 1432), and instructions for outputting the test vectors (test-vector-output module 1434). Data 1440 can include a component library 1442 and a fault library 1444.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for generating test vectors for a computational system, comprising:
   obtaining, by a computer, a design of the computational system, the design comprising an original system;
   generating a design of a fault-augmented system block by adding a plurality of fault-emulating subsystems to the original system;
   generating a design of an equivalence-checking system based on the original system and the fault-augmented system block;
   encoding the design of the equivalence-checking system into a logic formula, wherein variables within the logic formula comprise inputs and outputs of the original system and inputs and outputs of the fault-augmented system block; and
   solving the logic formula to obtain a test vector used for testing at least one fault in the computational system.

2. The method of claim 1, wherein the design of the equivalence-checking system comprises the original system and one or more fault-augmented system blocks, and wherein generating the design of the equivalence-checking system comprises:

coupling the inputs of the original system to corresponding inputs of each fault-augmented system block; and
coupling the outputs of the original system and corresponding outputs of each fault-augmented system block to a comparison module.

3. The method of claim 2, wherein the fault-augmented system block comprises a set of fault-assumable inputs, wherein a respective fault-assumable input corresponds to a fault-emulating subsystem, and wherein generating the design of the equivalence-checking system further comprises coupling the set of fault-assumable inputs to a first constraint system.

4. The method of claim 3, wherein the first constraint system is configured to apply a constraint on the set of fault-assumable inputs to ensure that the fault-augmented system block simulates one fault.

5. The method of claim 3, wherein generating the design of the equivalence-checking system further comprises coupling the fault-assumable inputs in the one or more fault-augmented system block to a second constraint system, wherein the second constraint system is configured to apply a constraint to ensure that different fault-augmented system blocks have different sets of fault-assumable inputs.

6. The method of claim 3, wherein generating the design of the equivalence-checking system comprises adding one fault-augmented system block at a time until there is no satisfying solution to the logic formula.

7. The method of claim 6, further comprising:
generating an design of an extended system, which includes the equivalence-checking system and at least one copy of the equivalence-checking system; and
solving a logic formula corresponding to the design of the extended system;
wherein generating the design of the extended system comprises coupling corresponding fault-assumable inputs from different fault-augmented system blocks of each of the equivalence-checking systems to a third constraint system configured to apply a constraint to ensure that an arbitrary fault is simulated by at least one fault-augmented system block.

8. The method of claim 7, wherein generating the design of the extended system comprises:
adding one copy of the equivalence-checking system at a time until a satisfying solution to the logic formula corresponding to the design of the extended system is found.

9. The method of claim 8, wherein the satisfying solution to the logic formula corresponding to the design of the extended system comprises a plurality of sets of assignments to the inputs of the original systems included in the extended system, wherein a respective set of assignments form a test vector, and wherein test vectors corresponding to the plurality of sets of assignments form a test suite capable of testing any arbitrary fault in the digital system.

10. The method of claim 1, wherein the computational system comprises one or more of:
a digital circuit;
an analog circuit;
a quantum circuit;
a reversible computing circuit;
an optical circuit;
a quantum optical circuit;
a processor; and
a computer program.

11. A non-transitory computer-readable storage medium storing instructions that when executed by a computer cause the computer to perform a method for generating test vectors for a computational system, the method comprising:
obtaining a design of the computational system, the design comprising an original system;
generating a design of a fault-augmented system block by adding a plurality of fault-emulating subsystems to the original system;
generating a design of an equivalence-checking system based on the original system and the fault-augmented system block;
encoding the design of the equivalence-checking system into a logic formula, wherein variables within the logic formula comprise inputs and outputs of the original system and inputs and outputs of the fault-augmented system block; and
solving the logic formula to obtain a test vector used for testing at least one fault in the computational system.

12. The non-transitory computer-readable storage medium of claim 11, wherein the design of the equivalence-checking system comprises the original system and one or more fault-augmented system blocks, and wherein generating the design of the equivalence-checking system comprises:
coupling the inputs of the original system to corresponding inputs of each fault-augmented system block; and
coupling the outputs of the original system and corresponding outputs of each fault-augmented system block to a comparison module.

13. The non-transitory computer-readable storage medium of claim 12, wherein the fault-augmented system block comprises a set of fault-assumable inputs, wherein a respective fault-assumable input corresponds to a fault-emulating subsystem, and wherein generating the design of the equivalence-checking system further comprises coupling the set of fault-assumable inputs to a first constraint system.

14. The non-transitory computer-readable storage medium of claim 13, wherein the first constraint system is configured to apply a constraint on the set of fault-assumable inputs to ensure that the fault-augmented system block simulates one fault.

15. The non-transitory computer-readable storage medium of claim 13, wherein generating the design of the equivalence-checking system further comprises coupling the fault-assumable inputs in the one or more fault-augmented system block to a second constraint system, wherein the second constraint system is configured to apply a constraint to ensure that different fault-augmented system blocks have different sets of fault-assumable inputs.

16. The non-transitory computer-readable storage medium of claim 13, wherein generating the design of the equivalence-checking system comprises adding one fault-augmented system block at a time until there is no satisfying solution to the logic formula.

17. The non-transitory computer-readable storage medium of claim 16, wherein the method further comprises:
generating an design of an extended system, which includes the equivalence-checking system and at least one copy of the equivalence-checking system; and
solving a logic formula corresponding to the design of the extended system;
wherein generating the design of the extended system comprises coupling corresponding fault-assumable inputs from different fault-augmented system blocks of each of the equivalence-checking systems to a third constraint system configured to apply a constraint to ensure that an arbitrary fault is simulated by at least one fault-augmented system block.

18. The non-transitory computer-readable storage medium of claim 17, wherein generating the design of the extended system comprises:
adding one copy of the equivalence-checking system at a time until a satisfying solution to the logic formula corresponding to the design of the extended system is found.

19. The non-transitory computer-readable storage medium of claim 18, wherein the satisfying solution to the logic formula corresponding to the design of the extended system comprises a plurality of sets of assignments to the inputs of the original systems included in the extended system, wherein a respective set of assignments form a test vector, and wherein test vectors corresponding to the plurality of sets of assignments form a test suite capable of testing any arbitrary fault in the digital system.

20. The non-transitory computer-readable storage medium of claim 11, wherein the computational system comprises one or more of:
a digital circuit;
an analog circuit;
a quantum circuit;
a reversible computing circuit;
an optical circuit;
a quantum optical circuit;
a processor; and
a computer program.

* * * * *